(12) United States Patent
Takafuji

(10) Patent No.: US 9,192,900 B2
(45) Date of Patent: Nov. 24, 2015

(54) GASIFICATION FURNACE RAW MATERIAL SUPPLYING APPARATUS

(75) Inventor: Makoto Takafuji, Kawasaki (JP)

(73) Assignee: IHI CORPORATION (JP)

( * ) Notice: Subject to any disclaimer, the term of this patent is extended or adjusted under 35 U.S.C. 154(b) by 344 days.

(21) Appl. No.: 13/701,592

(22) PCT Filed: Jun. 13, 2011

(86) PCT No.: PCT/JP2011/063472
§ 371 (c)(1),
(2), (4) Date: Dec. 3, 2012

(87) PCT Pub. No.: WO2011/158776
PCT Pub. Date: Dec. 22, 2011

(65) Prior Publication Data
US 2013/0089470 A1    Apr. 11, 2013

(30) Foreign Application Priority Data
Jun. 16, 2010    (JP) .................................. 2010-136949

(51) Int. Cl.
*B01J 7/00*    (2006.01)
*B01J 4/00*    (2006.01)
(Continued)

(52) U.S. Cl.
CPC ................ *B01J 4/001* (2013.01); *B01J 8/0045* (2013.01); *B01J 8/1872* (2013.01); *C10J 3/503* (2013.01); *F23C 10/22* (2013.01); *F23K 3/14* (2013.01);
(Continued)

(58) Field of Classification Search
CPC .......... C10J 2200/158; C10J 3/50; C10J 3/30; B01F 2005/0017; B01J 8/0045
See application file for complete search history.

(56) References Cited

U.S. PATENT DOCUMENTS 4,783,010 A    11/1988    Kissel ................................ 241/3
4,881,947 A *  11/1989    Parker et al. ...................... 48/89
(Continued)

FOREIGN PATENT DOCUMENTS

CN    1513742 A    7/2004
CN    2861160 Y    1/2007
(Continued)

OTHER PUBLICATIONS

Office Action dated Jun. 24, 2013 issued in corresponding Chinese Patent Application No. 201180028972.6 with English translation of Search Report only.
(Continued)

*Primary Examiner* — Imran Akram
(74) *Attorney, Agent, or Firm* — Ostrolenk Faber LLP

(57) ABSTRACT

In the gasification furnace raw material supplying apparatus, the protective gas (36) is jetted toward the fluidized bed (4) formed in the fluidized bed gasification furnace (1) from an end portion on the downstream side (B) of the screw feeder (28) in the raw material supplying direction using the nozzle (42) in the screw shaft (27). In addition, the protective gas (36) is jetted toward the fluidized bed (4) from the periphery of the end portion on the downstream side (B) of the screw feeder (28) in the raw material supplying direction using the nozzles (37) provided at the furnace wall (23) of the fluidized bed gasification furnace (1). As a result, the end portion of the screw shaft (27) on the downstream side (B) in the raw material supplying direction is prevented from being exposed to the bed material which is a component of the fluidized bed (4), and abrasion of the front end portion of the screw can be suppressed.

7 Claims, 4 Drawing Sheets

(51) Int. Cl.
 *F23K 3/14* (2006.01)
 *F23C 10/22* (2006.01)
 *C10J 3/50* (2006.01)
 *B01J 8/18* (2006.01)
 *B01J 8/00* (2006.01)

(52) U.S. Cl.
 CPC ... *B01J 2208/00752* (2013.01); *C10J 2200/158* (2013.01); *F23G 2205/121* (2013.01); *F23K 2203/202* (2013.01)

(56) References Cited

U.S. PATENT DOCUMENTS

| | | | | |
|---|---|---|---|---|
| 5,138,957 | A * | 8/1992 | Morey et al. | 110/234 |
| 2002/0159929 | A1 * | 10/2002 | Kaneko et al. | 422/190 |
| 2004/0071618 | A1 * | 4/2004 | Sprouse et al. | 422/232 |
| 2006/0231645 | A1 * | 10/2006 | Chan | 239/424 |
| 2009/0173005 | A1 * | 7/2009 | Neumann | 48/86 R |

FOREIGN PATENT DOCUMENTS

| | | |
|---|---|---|
| CN | 101160377 A | 4/2008 |
| CN | 101210202 A | 7/2008 |
| CN | 101387406 A | 3/2009 |
| CN | 201368453 Y | 12/2009 |
| JP | 31-008879 | 10/1956 |
| JP | 2001-239149 | 9/2001 |
| JP | 2009-215426 | 9/2009 |

OTHER PUBLICATIONS

International Search Report mailed Jul. 5, 2011 in corresponding PCT International Application No. PCT/JP2011/063472.

Office Action dated Feb. 8, 2014 issued in corresponding Chinese Patent Application No. 201180028972.6 with English translation.

* cited by examiner

GASIFICATION FURNACE RAW MATERIAL SUPPLYING APPARATUS

CROSS-REFERENCE TO RELATED APPLICATIONS

The present application is a 35 U.S.C. §§371 national phase conversion of PCT/JP2011/063472, filed Jun. 13, 2011, which claims priority of Japanese Patent Application No. 2010-136949, filed Jun. 16, 2010, the contents of which are incorporated herein by reference. The PCT International Application was published in the Japanese language.

TECHNICAL FIELD

The present invention relates to a gasification furnace raw material supplying apparatus.

BACKGROUND ART

In a fluidized bed gasification furnace of a twin tower gasification furnace, a high-temperature bed material (silica sand, limestone, or the like) is fluidized using water vapor injected from a bottom portion so as to form a fluidized bed, and solid raw materials, such as coal, biomass, and the like, are supplied to a free board above the fluidized bed in the above state. The solid raw materials are thermally decomposed using combustible gasification gas ($H_2$, CO, a hydrocarbon) of the solid raw materials and not-yet-combusted solid contents, some of the not-yet-combusted solid contents causes an aqueous gasification reaction with water vapor or moisture vaporized from the solid raw materials so as to generate combustible gasification gas ($H_2$ and CO), and some of CO reacts with water vapor, thereby generating $CO_2$ and $H_2O$.

An apparatus for supplying solid raw materials to the fluidized bed gasification furnace is disclosed in, for example, Patent Document 1. In the raw material supplying apparatus, solid raw materials are supplied using a screw feeder to the inside of a fluidized bed formed in the fluidized bed gasification furnace, and the solid raw materials are brought into sufficient contact with a high-temperature bed material and water vapor.

CITATION LIST

Patent Document

[Patent Document 1] Japanese Unexamined Patent Application, First Publication No. 2009-215426

SUMMARY OF INVENTION

Technical Problem

However, in the raw material supplying apparatus disclosed in Patent Document 1, since the front end (the downstream end in a raw material supplying direction) of the screw shaft (having an extrusion blade attached in a spiral shape to the outer circumferential surface of the rotary shaft) which is a component of the screw feeder is exposed to the bed material, the front end portion of the screw shaft becomes abraded within a short period of time.

The invention has been made in consideration of the above circumstances, and an object of the invention is to provide a gasification furnace raw material supplying apparatus in which abrasion of the front end portion of the screw can be suppressed.

Solution to Problem

In order to achieve the above object, a first aspect of the present invention is a gasification furnace raw material supplying apparatus including a screw feeder having a screw shaft inserted in a cylindrical casing in which the downstream end of the casing of the screw feeder in a raw material supplying direction is attached to the furnace wall of a fluidized bed gasification furnace, and solid raw materials are supplied to the inside of a fluidized bed formed in the fluidized bed gasification furnace using the screw feeder, in which gas jetting member for jetting protective gas toward a place in the fluidized bed in front of the screw feeder from the furnace wall side is included.

A second aspect of the present invention is the gasification furnace raw material supplying apparatus according to the first aspect, in which a nozzle that is provided at the furnace wall of the fluidized bed gasification furnace and jets the protective gas toward the fluidized bed from the periphery of the downstream end of the screw feeder in the raw material supplying direction is used as the gas jetting member. In this case, the nozzle provided at the furnace wall of the fluidized bed gasification furnace jets the protective gas toward the fluidized bed formed in the fluidized bed gasification furnace from the periphery of the downstream end of the screw feeder in the raw material supplying direction, and prevents the downstream end of the screw shaft in the raw material supplying direction from being exposed to a bed material which is a component of the fluidized bed. Therefore, the downstream end of the screw shaft in the raw material supplying direction does not become abraded within a short period of time, and the in-service period of the screw shaft is extended.

A third aspect of the present invention is the gasification furnace raw material supplying apparatus according to the first aspect, in which a nozzle that is provided at the downstream end of the screw shaft in the raw material supplying direction and jets the protective gas toward the fluidized bed from the center of the downstream end of the screw feeder in the raw material supplying direction is used as the gas jetting member. In this case, the nozzle provided at the screw shaft jets the protective gas toward the fluidized bed formed in the fluidized bed gasification furnace from the center of the downstream end of the screw feeder in the raw material supplying direction, and prevents the downstream end of the screw shaft in the raw material supplying direction from being exposed to a bed material which is a component of the fluidized bed. Therefore, the downstream end of the screw shaft in the raw material supplying direction does not become abraded within a short period of time, and the in-service period of the screw shaft is extended.

A fourth aspect of the present invention is the gasification furnace raw material supplying apparatus according to the first aspect, in which nozzles that are provided at the furnace wall of the fluidized bed gasification furnace and jet the protective gas toward the fluidized bed from the periphery of the downstream end of the screw feeder in the raw material supplying direction and a nozzle that is provided at the downstream end of the screw shaft in the raw material supplying direction and jets the protective gas toward the fluidized bed from the center of the downstream end of the screw feeder in the raw material supplying direction are used as the gas jetting member.

A fifth aspect of the present invention is the gasification furnace raw material supplying apparatus according to any one of the third and fourth aspect, in which the screw shaft has a hollow structure, an opening is provided at the upstream end of the screw shaft in the raw material supplying direction, and the protective gas is jetted toward the fluidized bed from nozzles provided at the downstream end of the screw shaft in the raw material supplying direction through the screw shaft by providing gas supplying pipes that supply the protective gas to the screw shaft through the opening at the upstream end of the casing in the raw material supplying direction.

A sixth aspect of the present invention is the gasification furnace raw material supplying apparatus according to any one of the first to fifth aspect, in which the inner diameter of the casing on the downstream side in the raw material supplying direction gradually decreases toward the fluidized bed gasification furnace. In this case, since the packing rate of the solid raw material at a place in which the inner diameter of the casing gradually decreases is high, and material sealing improves, the reverse flow of water vapor, gasification gas, and the like toward the screw feeder from the fluidized bed gasification furnace can be suppressed.

Advantageous Effects of Invention

In the gasification furnace raw material supplying apparatus of the invention, the gas jetting member jets protective gas toward a place in the fluidized bed in front of the screw feeder from the furnace wall side, and prevents the downstream end of the screw shaft in the raw material supplying direction from being exposed to a bed material which is a component of the fluidized bed. As a result, excellent effects, in which the downstream end of the screw shaft in the raw material supplying direction does not become abraded within a short period of time and the in-service period of the screw shaft is extended, can be exhibited.

DESCRIPTION OF EMBDODIMENTS

Hereinafter, embodiments of the invention will be described based on the accompanying drawings.

Figure 1:
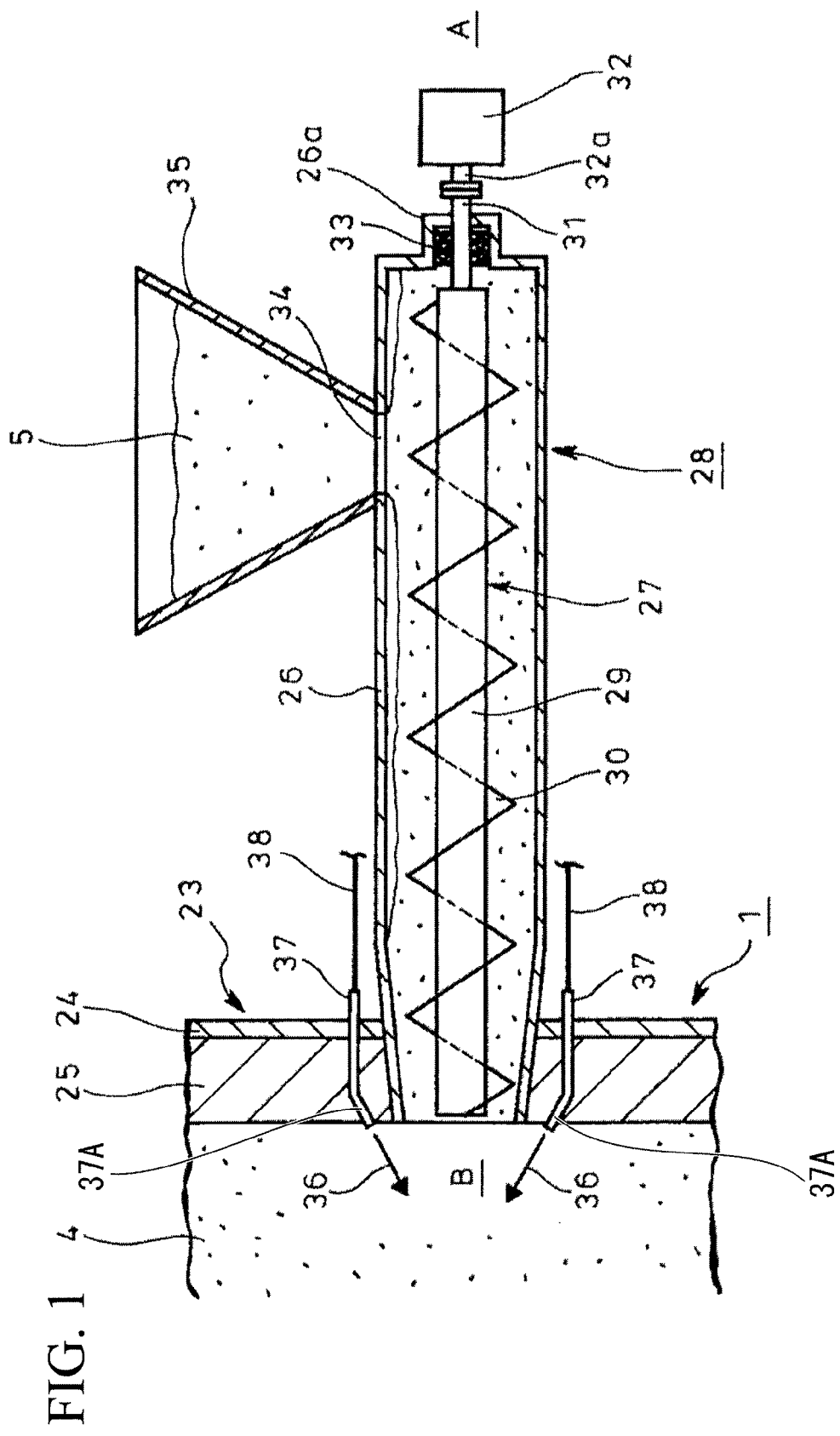
FIG. 1 is a conceptual view showing a first example of a gasification furnace raw material supplying apparatus of the invention.

FIG. 1 shows a first example of a gasification furnace raw material supplying apparatus of the invention. The gasification furnace raw material supplying apparatus can be applied to a fluidized bed gasification furnace 1 in which a fluidized bed 4 is formed by fluidizing a bed material (silica sand, limestone, or the like) using water vapor (gasifying agent) supplied from the bottom. A furnace wall 23 of the fluidized bed gasification furnace 1 is constituted by a steel sheet 24 as a structural member and a refractory material 25 installed inside the steel sheet 24.

The gasification furnace raw material supplying apparatus includes a screw feeder 28 having a screw shaft 27 rotatably inserted in a cylindrical casing 26. Since the screw shaft 27 has an extrusion blade 30 attached in a spiral shape to the outer circumferential surface of a rotary shaft 29, a transmission shaft 31 is provided at an end portion of the screw shaft 27 on the upstream side A in the raw material supplying direction so as to project outside the casing 26.

A driving shaft 32a of an electric motor 32 is coupled with the transmission shaft 31, and the screw shaft 27 rotates when the electric motor 32 is activated. An end portion of the casing 26 on the upstream side A in the raw material supplying direction forms a shaft sealing portion 26a having a smaller inner diameter than the portion in which the screw shaft 27 is inserted, and multiple sets of ground packing 33 are interposed as a sealing member between the inner circumferential surface of the shaft sealing portion 26a and the facing outer circumferential surface of the transmission shaft 31.

A raw material supplying opening 34 is provided above the end portion of the screw shaft 27 on the upstream side A in the raw material supplying direction in the casing 26, and a hopper 35 for introducing solid raw materials 5 (coal and biomass) into the casing 26 is installed so as to correspond to the raw material supplying opening 34.

Furthermore, the end portion of the casing 26 on a downstream side B in the raw material supplying direction penetrates the steel sheet 24 and the refractory material 25 of the furnace wall 23 in the thickness direction. The end portion is welded to the steel sheet 24 so as to oppose the fluidized bed 4 formed in the fluidized bed gasification furnace 1, thereby holding the airtightness of the fluidized bed gasification furnace 1.

The gasification furnace raw material supplying apparatus shown in FIG. 1 has the following 2 characteristics:

(1) A plurality of nozzles 37 that jets protective gas 36 toward the fluidized bed 4 from the periphery of the end portion of the casing 26 on the downstream side B in the raw material supplying direction was provided in the furnace wall 23 so as to surround the end portion on the downstream side B in the raw material supplying direction of the casing 26.

(2) The inner diameter of the end portion of the casing 26 on the downstream side B in the raw material supplying direction gradually decreases toward the fluidized bed gasification furnace 1.

Each of the nozzles 37 is a tubular member that penetrates the steel sheet 24 and the refractory material 25 of the furnace wall 23 in the thickness direction, and is welded to the steel sheet 24 so as to hold the airtightness of the fluidized bed gasification furnace 1. The front end portions of the nozzles 37 inflect toward one point in the extension direction of the screw shaft 27 as shown by reference sign 37A in FIG. 1. In addition, the front ends of the nozzles 37 opens at the inner wall of the refractory material 25.

Each of the nozzles 37 is connected to a gas source (not shown) through a gas supplying pipe 38, and supplies water vapor or $CO_2$ as the protective gas 36. The reason why water vapor or $CO_2$ is used as the protective gas 36 is that the gasifying agent supplied to the fluidized bed gasification furnace 1 is water vapor, and $CO_2$ is generated in the fluidized bed gasification furnace 1.

Next, the operation of the gasification furnace raw material supplying apparatus shown in FIG. 1 will be described. While the fluidized bed gasification furnace 1 is in operation, the screw shaft 27 rotates using the electric motor 32, the solid raw materials 5 dropped into the casing 26 from the hopper 35 through the raw material supplying opening 34 are pressed toward the fluidized bed gasification furnace 1 using the extrusion blade 30 on the screw shaft 27, and the solid raw materials 5 are supplied to the inside of the fluidized bed 4 formed in the fluidized bed gasification furnace 1.

At the same time, when the protective gas 36 accumulated in the gas source is supplied to the gas supplying pipe 38, the protective gas 36 is jetted toward the fluidized bed 4 from the nozzles 37 in the periphery of the end portion of the casing 26 on the downstream side B in the raw material supplying direction. The protective gas 36 jetted from the nozzles 37 prevents the end portion of the screw shaft 27 on the downstream side B in the raw material supplying direction from being exposed to the bed material (silica sand and limestone) which is a component of the fluidized bed 4. Therefore, abrasion of the end portion of the screw shaft 27 on the downstream side B in the raw material supplying direction, particularly, the extrusion blade 30 within a short period of time is suppressed, and the in-service period of the screw shaft 27 is extended.

In addition, since each of the nozzles 37 is constituted by a tubular member, the jetting area of the protective gas 36 jetted from each of the nozzles 37 does not change even when the front end of the nozzle 37 that opens in the inner wall of the refractory material 25 becomes abraded due to contact with the bed material. Therefore, it becomes possible to uniformly maintain the amount of the protective gas 36 jetted from each of the nozzles 37 regardless of abrasion of the nozzles 37, and it is possible to minimize the difference in the jetting amount between the nozzles 37 caused by abrasion. That is, abrasion of the nozzles 37 does not easily affect the function of the nozzles 37.

In addition, since the front end portions of the nozzles 37 inflect toward one point in the extension direction of the screw shaft 27 as shown by reference sign 37A, it becomes possible to concentrically jet the protective gas 36 toward a specific location in the fluidized bed 4 to which the front end portions of the nozzles 37 aim in cooperation with the fact that the nozzle 37 forms a tubular shape. As a result; it becomes possible to efficiently jet the protective gas 36 toward the front of the screw feeder 28.

In addition, since the inner diameter of the end portion of the casing 26 on the downstream side B in the raw material supplying direction gradually decreases toward the fluidized bed gasification furnace 1, the packing rate of the solid raw materials 5 in the end portion increases so that material sealing improves. As a result, the reverse flow of water vapor, gasification gas, and the like toward the upstream side A in the raw material supplying direction in the casing 26 is suppressed.

Figure 2:
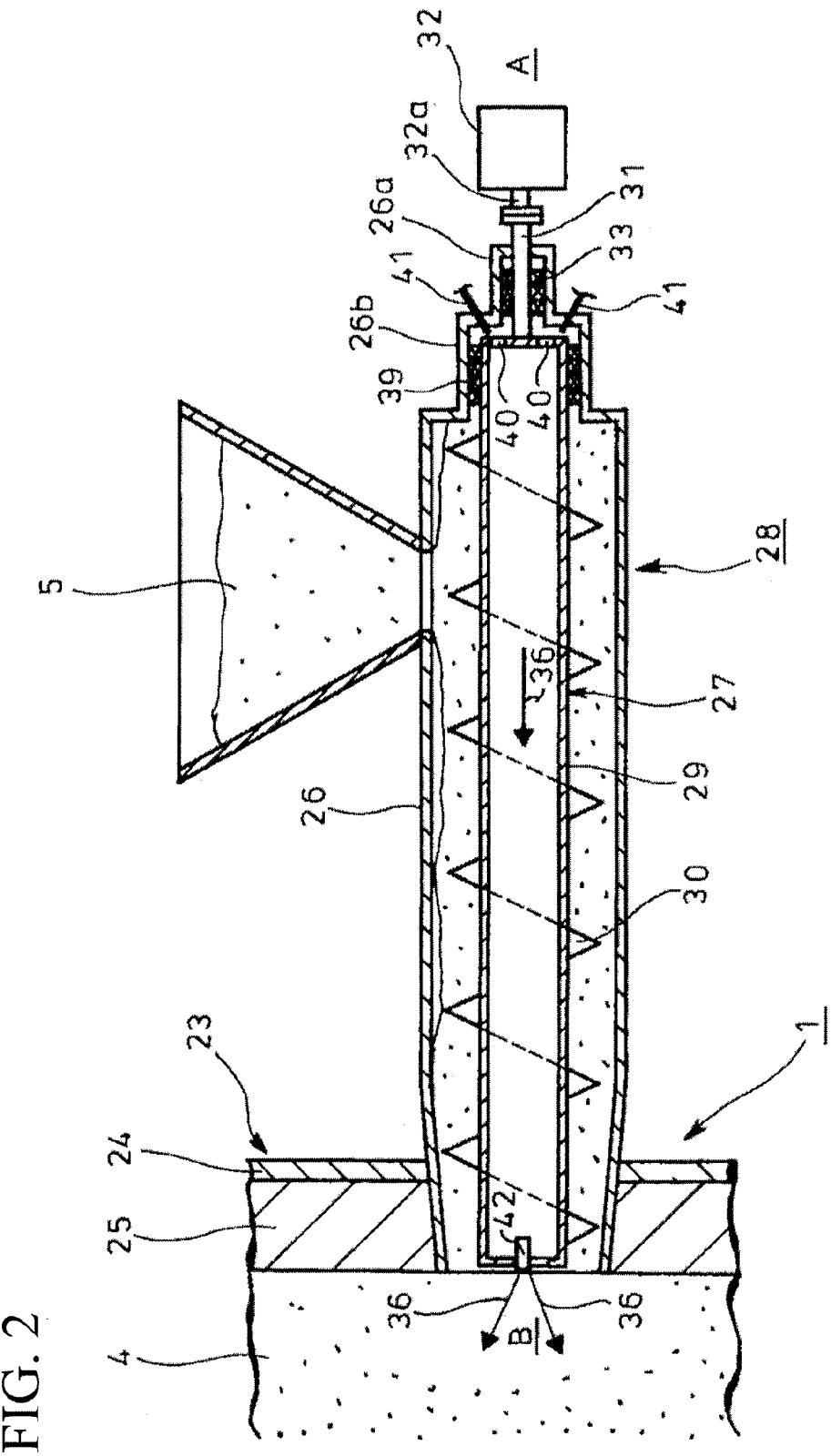
FIG. 2 is a conceptual view showing a second example of the gasification furnace raw material supplying apparatus of the invention.

FIG. 2 shows a second example of the gasification furnace raw material supplying apparatus of the invention, and, in the drawing, portions having the same reference signs as in FIG. 1 attached thereto represent the same objects.

The gasification furnace raw material supplying apparatus includes the screw feeder 28 having the screw shaft 27 rotatably inserted in the cylindrical casing 26. The screw shaft 27 is constituted by attaching the extrusion blade 30 in a spiral shape to the outer circumferential surface of the rotary shaft 29 having a hollow structure. In addition, the extrusion blade 30 is not attached to the outer circumferential surface of an end portion of the rotary shaft 29 in the upstream side A in the raw material supplying direction. Furthermore, the transmission shaft 31 is provided at the end portion of the screw shaft 27 on the upstream side A in the raw material supplying direction so as to project outside the casing 26.

The driving shaft 32a of the electric motor 32 is coupled with the transmission shaft 31, and the screw shaft 27 rotates when the electric motor 32 is activated. The end portion of the casing 26 on the upstream side A in the raw material supplying direction forms the shaft sealing portion 26a having a smaller inner diameter than the portion in which the screw shaft 27 is inserted. In addition, multiple sets of the ground packing 33 are interposed as a sealing member between the inner circumferential surface of the shaft sealing portion 26a and the facing outer circumferential surface of the transmission shaft 31. In the casing 26, a portion that surrounds the outer circumferential surface (a place in which the extrusion blade 30 is not provided) of the end portion of the rotary shaft 29 on the upstream side A in the raw material supplying direction from the outside in the circumferential direction forms a shaft sealing portion 26b which has a smaller inner diameter than the portion that surrounds the place in the rotary shaft 29 in which the extrusion blade 30 is provided and a larger inner diameter than the shaft sealing portion 26a. In addition, multiple sets of ground packing 39 are interposed as a sealing member between the inner circumferential surface of the shaft sealing portion 26b and the facing outer circumferential surface of the rotary shaft 29.

The gasification furnace raw material supplying apparatus shown in FIG. 2 has the following 3 characteristics:

(1) The rotary shaft 29 having a hollow structure was used as the screw shaft 27, an opening 40 was provided on an end surface of the rotary shaft 29 on the upstream side A in the raw material supplying direction, a gas supplying pipe 41 for supplying the protective gas 36 into the screw shaft 27 through the opening 40 was provided on an end surface of the shaft sealing portion 26a of the casing 26 on the upstream side A in the raw material supplying direction.

(2) A nozzle 42 that jets the protective gas 36 toward the fluidized bed 4 from the center of the end portion of the screw shaft 27 on the downstream side B in the raw material supplying direction was provided at the center portion of the end surface of the rotary shaft 29 on the downstream side B in the raw material supplying direction.

(3) The inner diameter of the end portion of the casing 26 on the downstream side B in the raw material supplying direction gradually decreased toward the fluidized bed gasification furnace 1.

The gas supplying pipe 41 penetrates the end surface of the shaft sealing portion 26b of the casing 26 on the upstream side A in the raw material supplying direction in the raw material supplying direction, and is welded to the shaft sealing portion 26b.

Each of the gas supplying pipes 41 is connected to a gas source (not shown), and supplies water vapor or $CO_2$ as the protective gas 36. The reason why water vapor or $CO_2$ is used as the protective gas 36 is that the gasifying agent supplied to the fluidized bed gasification furnace 1 is water vapor, and $CO_2$ is generated in the fluidized bed gasification furnace 1.

Figure 3:
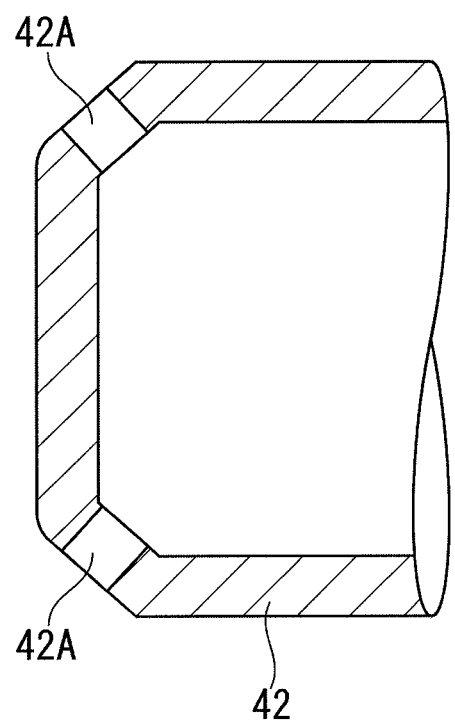
FIG. 3 is an enlarged view of a nozzle in FIG. 2.

The nozzle 42 penetrates the end surface of the rotary shaft 29 on the downstream side B in the raw material supplying direction and is fixed to the rotary shaft 29. A plurality of jetting holes is provided in the nozzle 42 so as to radially jet the protective gas 36. Specifically, as shown in FIG. 3, a plurality of the jetting holes 42A open at substantially equal intervals in the circumferential direction of the nozzle 42 on the front end surface of the nozzle 42. In addition, each of the jetting holes 42A is provided at a slant radially outward on the front end side of the nozzle 42 so as to jet the protective gas 36 radially outward toward the downstream side B in the raw material supplying direction.

Next, the operation of the gasification furnace raw material supplying apparatus shown in FIG. 2 will be described. While the fluidized bed gasification furnace 1 is in operation, the screw shaft 27 rotates using the electric motor 32, the solid raw materials 5 dropped into the casing 26 from the hopper 35 through the raw material supplying opening 34 are pressed toward the fluidized bed gasification furnace 1 using the extrusion blade 30 on the screw shaft 27, and the solid raw materials 5 are supplied to the inside of the fluidized bed 4 formed in the fluidized bed gasification furnace 1.

At the same time, when the protective gas 36 accumulated in the gas source is supplied to the gas supplying pipe 41, the protective gas 36 flows into the screw shaft 27 through the opening 40 and is jetted toward the fluidized bed 4 from the nozzle 42 fixed to the end surface of the screw shaft 27 on the downstream side B in the raw material supplying direction. The protective gas 36 jetted from the nozzle 42 prevents the end portion of the screw shaft 27 on the downstream side B in the raw material supplying direction from being exposed to the bed material (silica sand and limestone) which is a component of the fluidized bed 4. Therefore, abrasion of the end portion of the screw shaft 27 on the downstream side B in the raw material supplying direction, particularly, the extrusion blade 30 within a short period of time is suppressed, and the in-service period of the screw shaft 27 is extended.

In addition, each of the jetting holes 42A is provided at a slant radially outward on the front end side of the nozzle 42 so as to jet the protective gas 36 radially outward toward the downstream side B in the raw material supplying direction. Therefore, it becomes possible for the protective gas 36 to be radially jetted particularly toward a portion in front of the extrusion blade 30 at which the solid raw material 5 is supplied to the fluidized bed 4 from the screw feeder 28 in the end portion of the screw shaft 27 on the downstream side B in the raw material supplying direction. As a result, the flow of the fluidized bed 4 in the above portion is accelerated so that abrasion of the extrusion blade 30 is prevented, and supply of the solid raw material 5 into the fluidized bed 4 from the screw feeder 28 can be eased.

Furthermore, use of the hollow rotary shaft 29 as a path for the protective gas 36 makes it possible for the protective gas 36 to be jetted toward the fluidized bed 4 from the nozzle 42 provided at the center of the end portion of the rotating screw shaft 27. In addition, jetting of the protective gas 36 is made possible through the ground packing 33 and 39 interposed between the inner circumferential surface of the shaft sealing portion 26a and the outer circumferential surface of the transmission shaft 31 and between the inner circumferential surface of the shaft sealing portion 26b and the outer circumferential surface of the rotary shaft 29 and supply of the gas from the gas supplying pipe 41 provided at the shaft sealing portion 26b to the opening 40 provided at the rotary shaft 29 via a space formed between the ground packing 33 and 39. That is, use of the above configuration can satisfy both maintenance of gas sealing properties and jetting of the protective gas 36 from the nozzle 42 provided at the rotating screw shaft 27.

In addition, since the inner diameter of the end portion of the casing 26 on the downstream side B in the raw material supplying direction gradually decreases toward the fluidized bed gasification furnace 1, the packing rate of the solid raw materials 5 in the end portion increases so that material sealing improves. As a result, the reverse flow of water vapor, gasification gas, and the like toward the upstream side A in the raw material supplying direction in the casing 26 is suppressed.

In the gasification furnace raw material supplying apparatus shown in FIG. 2, the rotary shaft 29 having a hollow structure which is a component of the screw shaft 27 is used as a path for the protective gas 36, but pipes connecting the opening 40 and the upstream ends of the spaying holes in the nozzle 42 in a gas flowing direction may be provided in the rotary shaft 29.

In a case in which water vapor is used as the protective gas 36, even when moisture generated due to solidification of water vapor remains in the pipes when the gasification furnace raw material supplying apparatus is stopped, having the above pipes makes it possible for the moisture to be immediately sent into the fluidized bed gasification furnace 1 using the protective gas 36 when the gasification furnace raw material supplying apparatus is put into operation.

Alternatively, when the waveguide cross section of the protective gas 36 is decreased by employing a rotary shaft 29 having a large thickness so that the inner diameter of the rotary shaft 29 decreases, similarly to the case in which the above pipes are provided, even when moisture remains in the rotary shaft 29, it is possible for the moisture to be immediately sent into the fluidized bed gasification furnace 1 using the protective gas 36 when the gasification furnace raw material supplying apparatus is put into operation.

Here, the moisture remaining in the rotary shaft 29 shown in FIG. 2 in accordance with stopping of the gasification furnace raw material supplying apparatus is scattered so as to become fine water grains in the rotary shaft 29 due to the protective gas 36 after operation of the gasification furnace raw material supplying apparatus, and sent to the fluidized bed gasification furnace 1 together with the protective gas 36.

Figure 4:
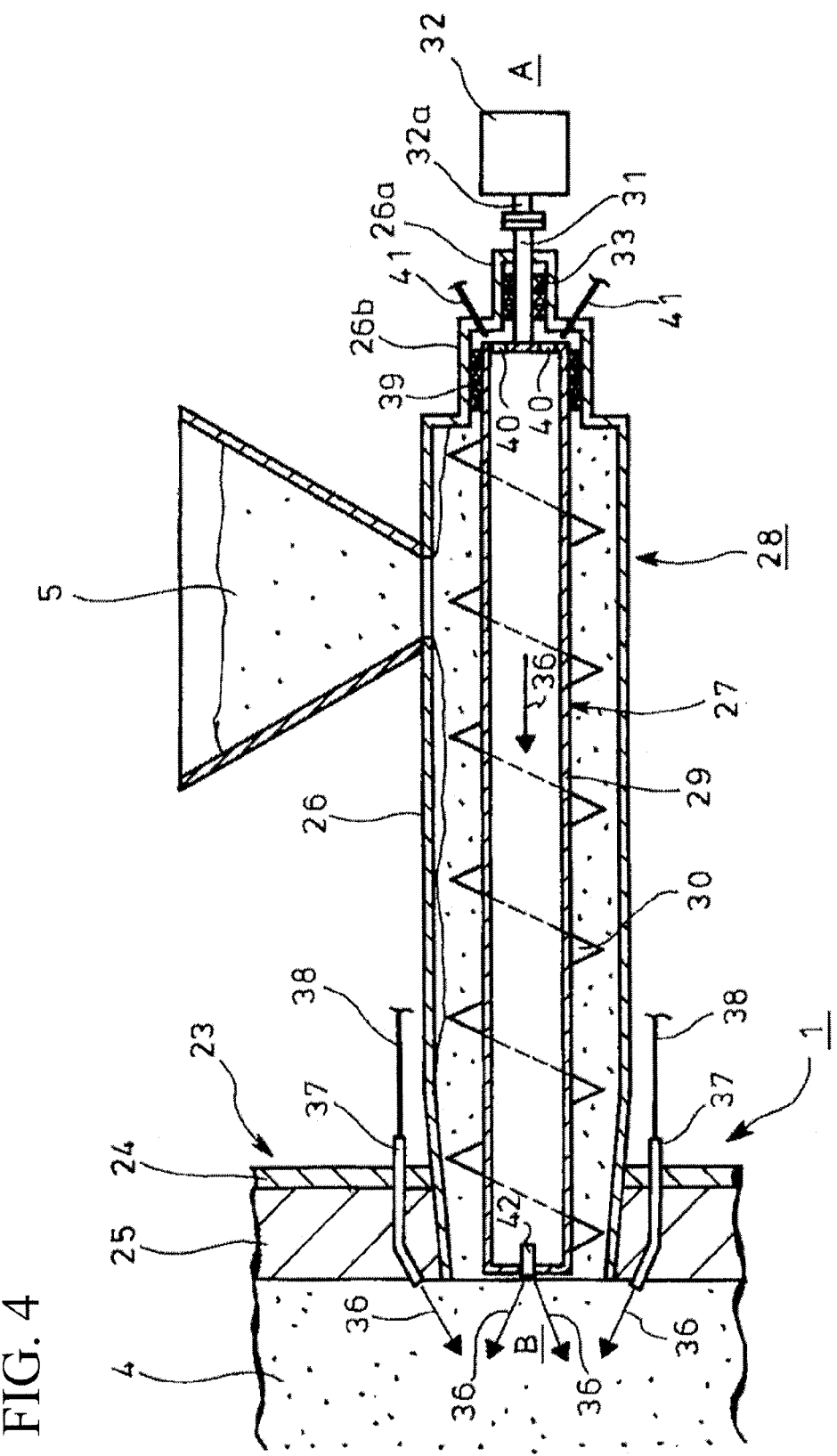
FIG. 4 is a conceptual view showing a third example of the gasification furnace raw material supplying apparatus of the invention.

FIG. 4 shows a third example of the gasification furnace raw material supplying apparatus of the invention, and, in the drawing, portions having the same reference signs as in FIGS. 1 and 2 indicate the same components. The gasification furnace raw material supplying apparatus has a combined configuration of the gasification furnace raw material supplying apparatuses shown in FIGS. 1 and 2, and therefore only characteristic portions will be described.

The gasification furnace raw material supplying apparatus shown in FIG. 4 has the following 4 characteristics:

(1) The rotary shaft 29 having a hollow structure was used as the screw shaft 27, the opening 40 was provided on an end surface of the rotary shaft 29 on the upstream side A in the raw material supplying direction, the gas supplying pipe 41 for supplying the protective gas 36 into the screw shaft 27 through the opening 40 was provided on an end surface of the shaft sealing portion 26b of the casing 26 on the upstream side A in the raw material supplying direction.

(2) The nozzle 42 that jets the protective gas 36 toward the fluidized bed 4 from the center of the end portion of the screw shaft 27 on the downstream side B in the raw material supplying direction was provided at the end surface of the rotary shaft 29 on the downstream side B in the raw material supplying direction.

(3) The nozzles 37 that can jet the protective gas 36 toward the fluidized bed 4 from the periphery of the end portion of the casing 26 on the downstream side B in the raw material supplying direction was provided at the furnace wall 23 so as to surround the end portion of the casing 26 on the downstream side B in the raw material supplying direction.

(4) The inner diameter of the end portion of the casing 26 on the downstream side B in the raw material supplying direction gradually decreased toward the fluidized bed gasification furnace 1.

Next, the operation of the gasification furnace raw material supplying apparatus shown in FIG. 4 will be described. While the fluidized bed gasification furnace 1 is in operation, the screw shaft 27 rotates using the electric motor 32, the solid raw materials 5 dropped into the casing 26 from the hopper 35 through the raw material supplying opening 34 are pressed toward the fluidized bed gasification furnace 1 using the extrusion blade 30 on the screw shaft 27, and the solid raw materials 5 are supplied to the inside of the fluidized bed 4 formed in the fluidized bed gasification furnace 1.

At the same time, when the protective gas 36 accumulated in the gas source is supplied to the gas supplying pipe 41, the protective gas 36 flows into the screw shaft 27 through the opening 40 and is jetted toward the fluidized bed 4 from the nozzle 42 fixed to the end surface of the screw shaft 27 on the downstream side B in the raw material supplying direction. In addition, when the protective gas 36 accumulated in the gas source in parallel is supplied to the gas supplying pipe 38, the protective gas 36 is jetted toward the fluidized bed 4 from the respective nozzles 37 in the periphery of the end portion of the casing 26 on the downstream side B in the raw material supplying direction. The protective gas 36 jetted from the nozzle 42 and the nozzles 37 prevents the end portion of the screw shaft 27 on the downstream side B in the raw material supplying direction from being exposed to the bed material (silica sand and limestone) which is a component of the fluidized bed 4. Therefore, abrasion of the end portion of the screw shaft 27 on the downstream side B in the raw material supplying direction, particularly, the extrusion blade 30 within a short period of time is suppressed, and the in-service period of the screw shaft 27 is extended.

In addition, since the inner diameter of the end portion of the casing 26 on the downstream side B in the raw material supplying direction gradually decreases toward the fluidized bed gasification furnace 1, the packing rate of the solid raw materials 5 in the end portion increases so that material sealing improves. As a result, the reverse flow of water vapor, gasification gas, and the like toward the upstream side A in the raw material supplying direction in the casing 26 is suppressed.

In the gasification furnace raw material supplying apparatus shown in FIG. 4, the rotary shaft 29 having a hollow structure which is a component of the screw shaft 27 is used as a path for the protective gas 36, but pipes connecting the opening 40 and the upstream ends of the spaying holes in the nozzle 42 in the gas flowing direction may be provided in the rotary shaft 29.

In a case in which water vapor is used as the protective gas 36, even when moisture generated due to solidification of water vapor remains in the pipes when the gasification furnace raw material supplying apparatus is stopped, having the above pipes makes it possible for the moisture to be immediately sent into the fluidized bed gasification furnace 1 using the protective gas 36 when the gasification furnace raw material supplying apparatus is put into operation.

Alternatively, when the path cross section of the protective gas 36 is decreased by employing a rotary shaft 29 having a large thickness so that the inner diameter of the rotary shaft 29 decreases, similarly to the case in which the above pipes are provided, even when moisture remains in the rotary shaft 29, it is possible for the moisture to be immediately sent into the fluidized bed gasification furnace 1 using the protective gas 36 when the gasification furnace raw material supplying apparatus is put into operation.

In the gasification furnace raw material supplying apparatuses shown in FIGS. 1, 2, and 4, the screw feeder 28 is horizontally attached to the fluidized bed gasification furnace 1, but the screw feeder 28 may be attached to the fluidized bed gasification furnace 1 on a downward slope from the upstream side A in the raw material supplying direction to the downstream side B in the raw material supplying direction, or may be attached to the fluidized bed gasification furnace 1 on a upward slope from the upstream side A in the raw material supplying direction to the downstream side B in the raw material supplying direction. Particularly, in the latter case, the packing rate of the solid raw material 5 in the casing 26 is high as a whole so that material sealing improves, and the reverse flow of water vapor, gasification gas, and the like toward the upstream side A in the raw material supplying direction in the casing 26 is effectively suppressed.

Industrial Applicability

According to the gasification furnace raw material supplying apparatus of the invention, the downstream end of the screw shaft in the raw material supplying direction does not become abraded within a short period of time, and the in-service period of the screw shaft is extended.

REFERENCE SIGNS LIST

1 FLUIDIZED BED GASIFICATION FURNACE
4 FLUIDIZED BED
5 SOLID RAW MATERIAL
23 FURNACE WALL
26 CASING
27 SCREW SHAFT
36 PROTECTIVE GAS
37 NOZZLE
9 GROUND PACKING
40 OPENING
41 GAS SUPPLYING PIPE
42 NOZZLE
42A JETTING HOLE
A UPSTREAM SIDE IN RAW MATERIAL SUPPLYING DIRECTION
B DOWNSTREAM SIDE IN RAW MATERIAL SUPPLYING DIRECTION

The invention claimed is:

1. A gasification furnace raw material supplying apparatus comprising:
   a screw feeder having a screw shaft inserted in a cylindrical casing in which a downstream end of the casing in a raw material supplying direction is attached to a furnace wall of a fluidized bed gasification furnace, and configured to supply solid raw materials via a raw materials supply path within the casing to an inside of a fluidized bed formed in the fluidized bed gasification furnace; and
   a gas jetting member jetting protective gas into the fluidized bed gasification furnace,
   wherein the gas jetting member includes a nozzle that is configured and positioned to jet the protective gas toward into a place in the fluidized bed in front of the screw feeder;
   wherein the gas jetting member supplies the protective gas to the nozzle via a protective gas supply path without carrying the protective gas through the raw materials supply path, the nozzle and the protective gas supply path being disposed at different positions from the raw materials supply path; and
   wherein there is no fluid communication between the raw materials supply path and the protective gas supply path within the casing.

2. The gasification furnace raw material supplying apparatus according to claim 1,
   wherein the gas jetting member includes a nozzle that is provided at the furnace wall of the fluidized bed gasification furnace and that is configured to jet the protective gas into the fluidized bed from a position on outside of the casing in a radial direction of the casing.

3. The gasification furnace raw material supplying apparatus according to claim 1,
   wherein the gas jetting member includes a nozzle that is provided at a downstream end of the screw shaft in the raw material supplying direction and that is configured to jet the protective gas into the fluidized bed from the center of a downstream end of the screw feeder in the raw material supplying direction.

4. The gasification furnace raw material supplying apparatus according to claim 3,
wherein the screw shaft has a hollow structure,
an upstream end of the screw shaft in the raw material supplying direction is provided with an opening,
an upstream end of the casing in the raw material supplying direction is provided with gas supplying pipes supplying the protective gas into the screw shaft through the opening, and
the gas jetting member is configured to jet the protective gas into the fluidized bed from the nozzle through the screw shaft.

5. The gasification furnace raw material supplying apparatus according to claim 1,
wherein the gas jetting member includes first and second nozzles,
the first nozzle is provided at the furnace wall of the fluidized bed gasification furnace and is configured to jet the protective gas into the fluidized bed from a position on outside of the casing in a radial direction of the casing, and
the second nozzle is provided at a downstream end of the screw shaft in the raw material supplying direction and is configured to jet the protective gas into the fluidized bed from the center of a downstream end of the screw feeder in the raw material supplying direction.

6. The gasification furnace raw material supplying apparatus according to claim 5,
wherein the screw shaft has a hollow structure,
an upstream end of the screw shaft in the raw material supplying direction is provided with an opening,
an upstream end of the casing in the raw material supplying direction is provided with gas supplying pipes supplying the protective gas into the screw shaft through the opening, and
the gas jetting member is configured to jet the protective gas into the fluidized bed from the second nozzle through the screw shaft.

7. The gasification furnace raw material supplying apparatus according to claim 1,
wherein the inner diameter of the casing on the downstream side thereof in the raw material supplying direction gradually decreases toward the fluidized bed gasification furnace.

* * * * *